(12) United States Patent
Yu

(10) Patent No.: US 8,149,311 B2
(45) Date of Patent: Apr. 3, 2012

(54) COMPLEMENTARY METAL-OXIDE SEMICONDUCTOR (CMOS) IMAGE SENSOR

(75) Inventor: Seong-Han Yu, Cheongju-si (KR)

(73) Assignee: Intellectual Ventures II LLC, Wilmington, DE (US)

( * ) Notice: Subject to any disclaimer, the term of this patent is extended or adjusted under 35 U.S.C. 154(b) by 1262 days.

(21) Appl. No.: 11/321,557

(22) Filed: Dec. 28, 2005

(65) Prior Publication Data

US 2007/0146517 A1    Jun. 28, 2007

(30) Foreign Application Priority Data

Dec. 30, 2004   (KR) ................ 10-2004-0115887

(51) Int. Cl.
- H04N 5/335 (2011.01)
- H04N 5/225 (2006.01)
- H01L 31/062 (2012.01)
- H01L 27/00 (2006.01)

(52) U.S. Cl. ........ 348/308; 348/311; 348/372; 257/291; 257/292; 257/293; 250/208.1

(58) Field of Classification Search ................ 348/308, 348/311, 372; 257/291–293; 250/208.1
See application file for complete search history.

(56) References Cited

U.S. PATENT DOCUMENTS

| | | | |
|---|---|---|---|
| 6,674,471 B1 * | 1/2004 | Masuyama | 348/312 |
| 2004/0004851 A1 * | 1/2004 | Itoh | 363/124 |
| 2004/0252211 A1 | 12/2004 | Rhodes | |
| 2005/0224842 A1 | 10/2005 | Toyama | |
| 2006/0006915 A1 * | 1/2006 | Yan et al. | 327/175 |

FOREIGN PATENT DOCUMENTS

| | | |
|---|---|---|
| JP | 2000209508 | 7/2000 |
| WO | 03085964 | 10/2003 |

OTHER PUBLICATIONS

Japanese Office Action for JP 2005-379739 (a counterpart application), dated Sep. 9, 2010 and English translation.

* cited by examiner

*Primary Examiner* — Jason Chan
*Assistant Examiner* — Joel Fosselman
(74) *Attorney, Agent, or Firm* — McAndrews, Held & Malloy Ltd.

(57) ABSTRACT

A CMOS image sensor includes a unit pixel including controlled by a high voltage; a reference high voltage generator for generating a reference high voltage; and a high voltage output unit for generating the high voltage by using the reference high voltage as an operating voltage to thereby output the high voltage to the unit pixel, wherein a level of the high voltage is stably maintained regardless of a variations of the reference high voltage level.

27 Claims, 4 Drawing Sheets

COMPLEMENTARY METAL-OXIDE SEMICONDUCTOR (CMOS) IMAGE SENSOR

FIELD OF THE INVENTION

The present invention relates to a semiconductor device; and, more particularly, to a CMOS image sensor having high voltage supply circuits.

DESCRIPTION OF RELATED ART

In general, an image sensor is one of semiconductor devices for converting an optical image into an electrical signal. The representative image sensor is mainly classified into a charge coupled device (CCD) and a complementary metal oxide semiconductor (CMOS) image sensor.

In the CCD, metal-oxide-silicon (MOS) capacitors are arranged such that they are very close to one another, and charge carriers are stored at the capacitors and they are transferred. On the contrary, in the CMOS image sensor, a plurality of MOS transistors, which are correspondent to number of unit pixels, are fabricated using a CMOS technology where a control circuit and a signal processing circuit are used as a peripheral circuit and thus, a processed data is outputted sequentially using the MOS transistors and the peripheral circuit. Herein, the CMOS image sensor employs four MOS transistors typically.

Figure 1:
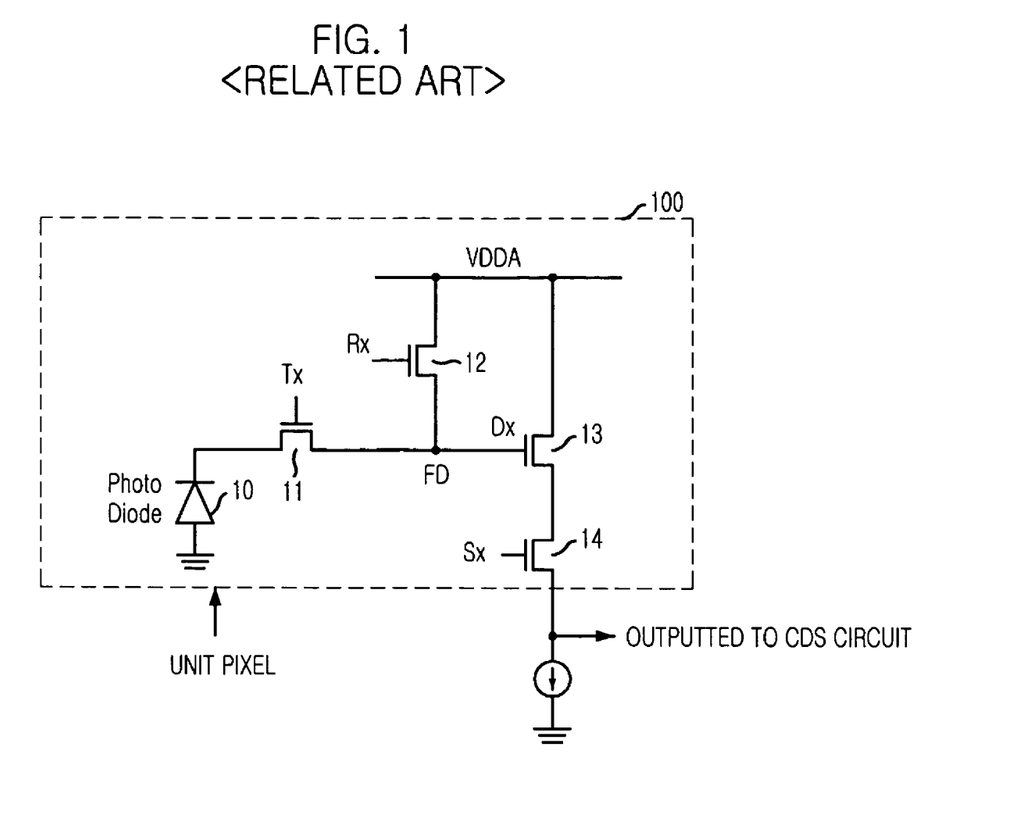
FIG. 1 is a circuit diagram setting forth a unit pixel of a conventional CMOS image sensor.

FIG. 1 is a circuit diagram setting forth a unit pixel of a conventional CMOS image sensor.

As shown, a unit pixel 100 includes one photodiode 10 and four NMOS transistors 11, 12, 13 and 14. The four NMOS transistors are configured with a transfer MOS transistor 11 for transferring photocharges generated at the photodiode 10 to a charge sensing node N, a reset MOS transistor 12 for discharging the photocharges stored at the charge sensing node N for detecting a next signal, a drive MOS transistor 13 for acting as a source follower, and a select MOS transistor 14 for serving roles in switching and addressing.

In this manner, the four MOS transistors 11, 12, 13 and 14 and one photodiode 10 constitute one unit pixel. According to the number of the unit pixels included in the CMOS image sensor, the numbers of the photodiodes and the MOS transistors included in a pixel array of the CMOS image sensor is determined.

The image sensor receives a light through an optical lens and outputs an electrical digital code corresponding to each color.

According to a desired resolution, the number of the unit pixels is determined. Each unit pixel operates through one photodiode 10 and four transistors 11, 12, 13 and 14 as shown in FIG. 1 in general.

The photodiode 10 accumulates electrons corresponding to an incident light and the accumulated electrons are transferred to the sensing node FD, i.e., a floating diffusion node, through the transfer transistor 11 acting as a switch.

The drive transistor 13 acting as the source follower drives a source terminal according to the electrons applied to the sensing node FD. Thereafter, if the select transistor 14 is turned on, a predetermined signal, which is driven by the drive transistor 13, is outputted to a correlated double sampling (CDS) circuit.

At this time, the predetermined signal outputted to the CDS circuit incorporates a noise component existing at the sensing node FD as well as a pure data signal transferred to the sensing node FD.

Therefore, there is a need for eliminating this noise component. To this end, the CMOS image sensor turns on the reset transistor 12 first to receive a reset signal from the sensing node FD. Afterwards, the CDS receives the data signal having the reset signal and calculates a voltage difference between a reset signal voltage and a data signal voltage after measuring the reset and data signal voltages, respectively. Thus, the voltage difference is used as an actual data signal.

However, in case that the reset transistor 12 is turned on for outputting the reset signal, a voltage reduced to a threshold voltage of the reset transistor 12 is transferred to the sensing node FD. Likewise, a voltage reduced to a threshold voltage of the drive transistor 13 from the voltage level of the sensing node FD is transferred to the source terminal of the drive transistor 13. Therefore, a dynamic range decreases to the threshold voltage level of the reset transistor 12.

In addition, the signal transferred by the photodiode 10 must be transferred in such a state that its voltage level is reduced to the threshold voltage levels of the transfer transistor 11 and the driving transistor 13.

This is because all the transistors arranged in the unit pixel of the CMOS image sensor are configured to be NMOS transistors so that it is impossible to transfer the signal of which the voltage level is lower than the threshold voltage level.

In particular, all the photocharges accumulated at the photodiode 10 cannot be transferred to the sensing node FD under low light level condition so that an image becomes somewhat dark in whole, which results in degrading a total image quality.

SUMMARY OF THE INVENTION

It is, therefore, an object of the present invention to provide a CMOS image sensor of which a dynamic range does not decrease to threshold voltages of transistors in spite of configuring the transistors as NMOS transistors in each unit pixel.

In accordance with an aspect of the present invention, there is provided a CMOS image sensor including: a unit pixel including controlled by a high voltage; a reference high voltage generator for generating a reference high voltage; and a high voltage output unit for generating the high voltage by using the reference high voltage as an operating voltage to thereby output the high voltage to the unit pixel, wherein a level of the high voltage is stably maintained regardless of a variations of the reference high voltage level.

In accordance with another aspect of the present invention, there is provided a semiconductor device for converting an optical image into an electrical signal, the semiconductor device including: a unit pixel including controlled by a high voltage; and a high voltage output unit for generating the high voltage to thereby output the high voltage to the unit pixel, wherein the high voltage output unit includes: a reference voltage generator for amplifying a voltage divided from an operational voltage to generate the amplified voltage as a reference voltage; and a regulator for generating the high voltage by amplifying a voltage induced from an inputted reference voltage by an operational amplifier, to thereby output the high voltage to the unit pixel.

BRIEF DESCRIPTION OF THE DRAWINGS

The above and other objects and features of the present invention will become better understood with respect to the following description of the preferred embodiments given in conjunction with the accompanying drawings, in which.

DETAILED DESCRIPTION OF THE INVENTION

A CMOS image sensor in accordance with exemplary embodiments of the present invention will be described in detail with reference to the accompanying drawings.

Figure 2:
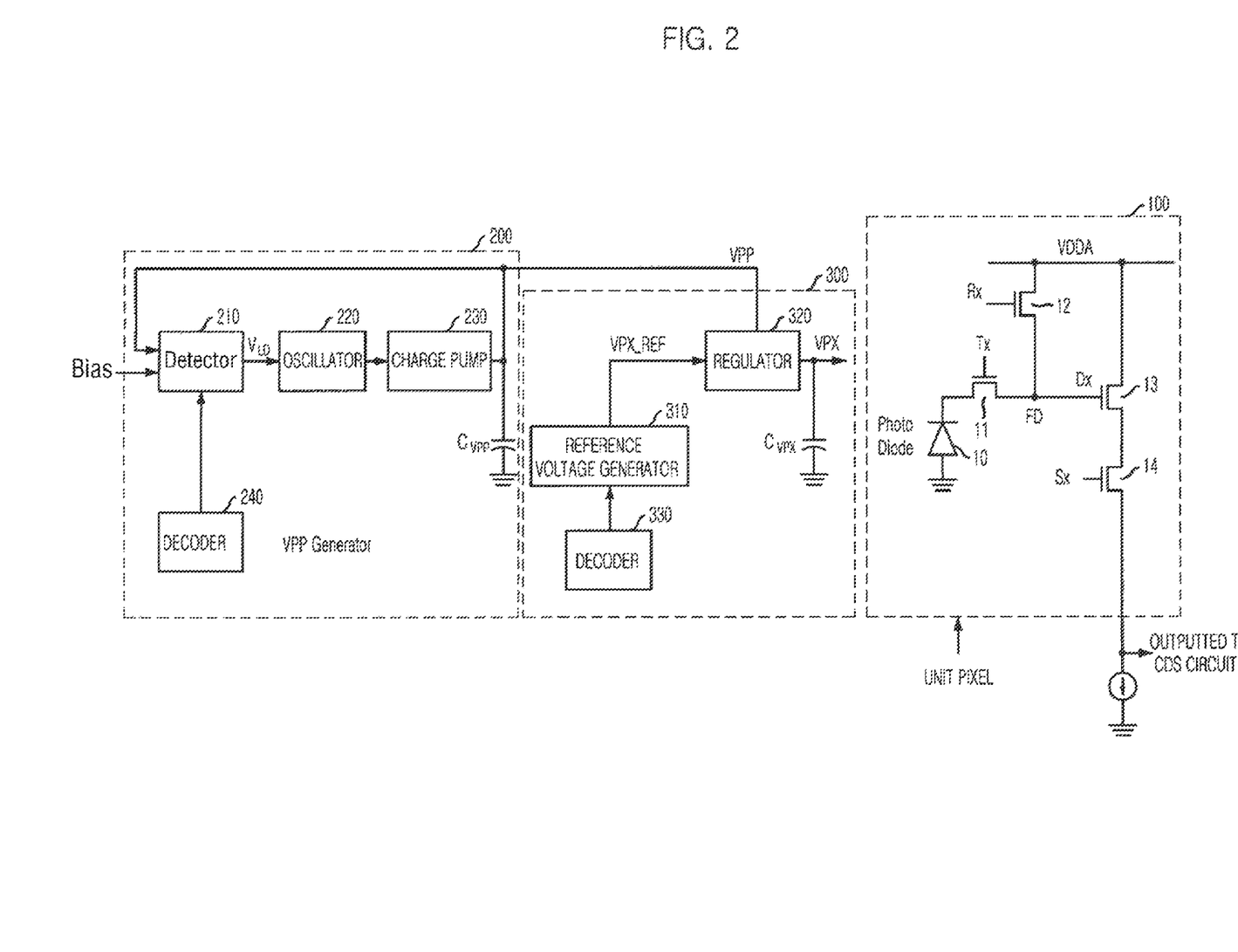
FIG. 2 is a block diagram illustrating a CMOS image sensor in accordance with a preferred embodiment of the present invention.

FIG. 2 is a block diagram illustrating a CMOS image sensor in accordance with a preferred embodiment of the present invention.

As shown, the CMOS image sensor of the present invention includes a unit pixel 100 and high voltage supply circuits 200 and 300, wherein the unit pixel 100 is provided with a photodiode 10 for transferring a data signal accumulated corresponding to an incident light, a transfer transistor 11 for transferring the data signal from the photodiode 10 to a sensing node FD, and a drive transistor 13 of which one side is connected to a power voltage supply terminal VDDA for driving the other side thereof after receiving the data signal transferred from the sensing node FD through a gate thereof. Herein, one side and the other side of each transistor act as source and drain. Meanwhile, the high voltage supply circuits 200 and 300 play roles in supplying a high voltage VPX of which level is higher than a level of a power voltage applied from the power voltage supply terminal VDDA, as a transfer gate voltage VTX.

In addition, the CMOS image sensor of the present invention further includes a reset transistor 12 connected between the power voltage supply terminal VDDA and the sensing node FD, wherein the reset transistor 12 receives the high voltage VPX as a gate voltage VRX.

A distinct characteristic of the present invention is that the high voltage VPX of which the level is higher than the power voltage is generated and applied to the gates of the transfer transistor 11 and the reset transistor 12 in the unit pixel 100 of the CMOS image sensor.

At this time, the high voltage for the transfer transistor 11 and the high voltage for the reset transistor 12 may be separately generated and applied thereto. However, in the present invention, one high voltage VPX is commonly generated and is applied as the gate voltage VTX for the transfer for the transfer and the gate voltage VRX for the reset transistor 12.

There is an advantageous merit that an optimum high voltage suitable for each operational characteristic can be generated and applied to the transfer and the reset transistors 11 and 12 if the high voltages for the transfer and the reset transistors 11 and 12 are separately generated, whereas there is a drawback that an additional circuit for generating another high voltage is inevitably needed.

Hereinafter, supposing that one high voltage be generated and applied to each gate of the transfer transistor 11 and the reset transistor 12, detail descriptions will be set forth.

The high voltage supply circuits 200 and 300 is provided with a reference high voltage generator 200 for generating a reference high voltage VPP of which a level is higher than the level of the high voltage VPX, and a high voltage output unit 300 for outputting the high voltage VPX with a stable voltage level regardless of fluctuation of the reference high voltage VPP. The high voltage output unit 300 outputs the high voltage VPX after reducing the level of the reference high voltage VPP to the level of the high voltage VPX.

The reference high voltage generator 200 includes a detector 210 for detecting the level of the reference high voltage VPP inputted to the high voltage output unit 300, an oscillator 220 for outputting an oscillated clock in response to the detection result of the detector 210, and a charge pump 230 for applying the reference high voltage VPP to the high voltage output unit 300 by pumping charges to an output terminal in response to the oscillated clock of the oscillator 220.

In addition, the reference high voltage generator 200 further includes a decoder 240 for transferring a set value to the detector 210 in order to adjust a level of the voltage detected at the detector 210.

The high voltage output unit 300 includes a reference voltage generator 310 for outputting a reference voltage VPX_REF obtained by dividing the power voltage VDDA into a predetermined voltage level, and a regulator 320 for outputting the high voltage VPX after reducing the reference high voltage VPP to the high voltage VPX in response to the reference voltage VPX_REF.

The high voltage output unit 300 further includes a decoder 330 for transferring a set value to the reference voltage generator 310 in order to adjust a level of the reference voltage VPX_REF outputted from the reference voltage generator 310.

Figure 3:
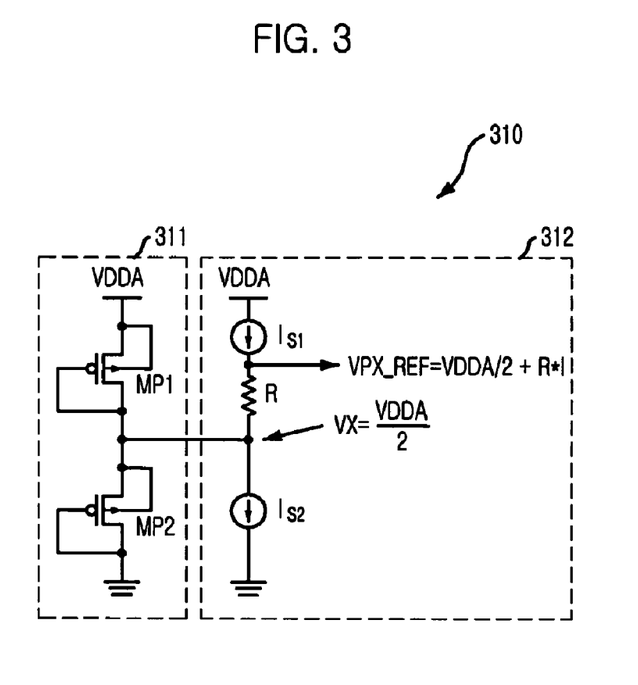
FIG. 3 is a circuit diagram explaining a reference voltage generator of FIG. 2.

FIG. 3 is a circuit diagram explaining the reference voltage generator 310 of FIG. 2.

As shown, the reference voltage generator 310 is provided with a voltage divider 311 for outputting a division voltage VDDA/2 obtained by dividing the power voltage applied from the power voltage supply terminal VDDA, and a reference voltage supplier 312 for supplying the reference voltage VPX_REF. Herein, the reference voltage VPX_REF is obtained by summing the division voltage VDDA/2 with a voltage RXI with a predetermined level due to the set value.

The voltage divider 311 is provided with a first PMOS transistor MP1 of which one side is connected to the power voltage supply terminal VDDA and a gate is connected to the other side thereof, and a second PMOS transistor MP2 connected between the other side of the first PMOS transistor MP1 and a ground voltage supply terminal. Meanwhile, the gate and the other side of the second PMOS transistor MP2 are commonly connected to the ground voltage supply terminal.

Herein, though the voltage divider 311 is implemented using the PMOS transistors, it is possible to construct the voltage divider 311 such that NMOS transistors are diode-connected to each other.

The reference voltage generator 312 is provided with a first current source Is1 connected to the power voltage supply terminal VDDA for applying a current after adjusting the current to have a predetermined amount corresponding to the set value, a second current source Is2 connected to the ground voltage supply terminal, and a resistor R provided between the first and the second current sources Is1 and Is2. Herein, the division voltage, which is represented as VX equal to VDDA/2, is applied to one end of the resistor R.

Figure 4:
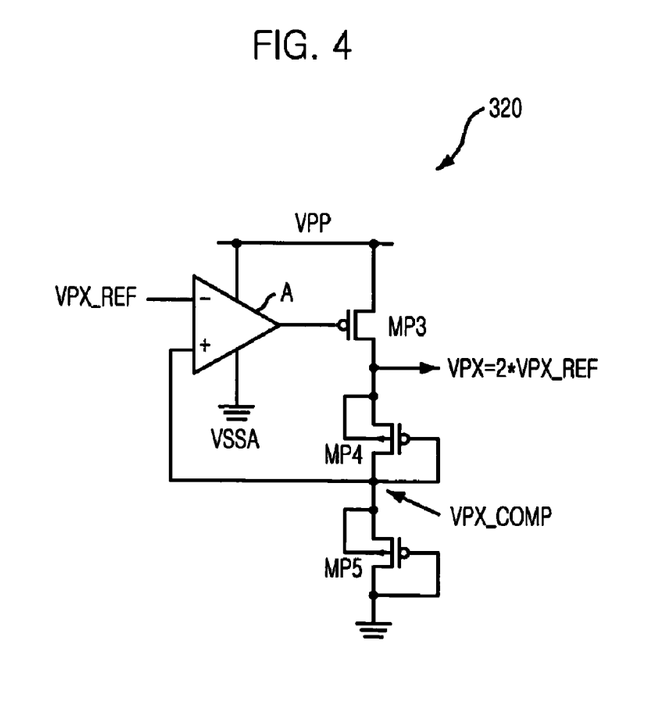
FIG. 4 is a circuit diagram representing a regulator of FIG. 2.

FIG. 4 is a circuit diagram representing the regulator 320 of FIG. 2.

As shown, the regulator 320 is provided with operational amplifier A, a first PMOS transistor MP3, a second PMOS transistor MP4 and a third PMOS transistor MP5. The operational amplifier A receives the reference high voltage VPP and the ground voltage VSSA as a driving voltage. Furthermore, the operational amplifier A receives a feedback voltage VPX_COMP through a positive terminal and the reference voltage VPX_REF through a negative terminal. The first PMOS transistor MP3 receives the reference high voltage VPP through one side thereof to output the high voltage VPX through the other side thereof in response to the output of the operational amplifier A. In the second PMOS transistor MP4, one side and a bulk terminal are commonly connected to the other side of the first PMOS transistor MP3 and its gate is connected to the other side thereof. The second PMOS transistor MP4 applies the feedback voltage VPX_COMP through the other side thereof to the operational amplifier A. In the third PMOS transistor MP5, one side and a bulk terminal are commonly connected to the other side of the second PMOS transistor MP4 and the gate and the other side are commonly connected to the ground voltage supply terminal.

Figure 5:
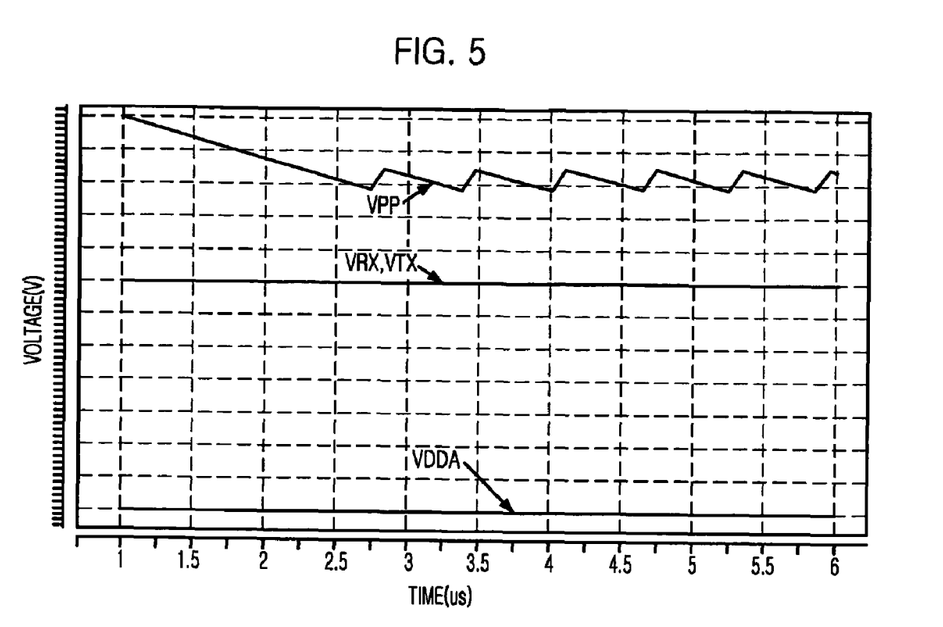
FIGS. 5 and 6 are waveform diagrams showing an operation of the CMOS image sensor of FIG. 2.
Figure 6:
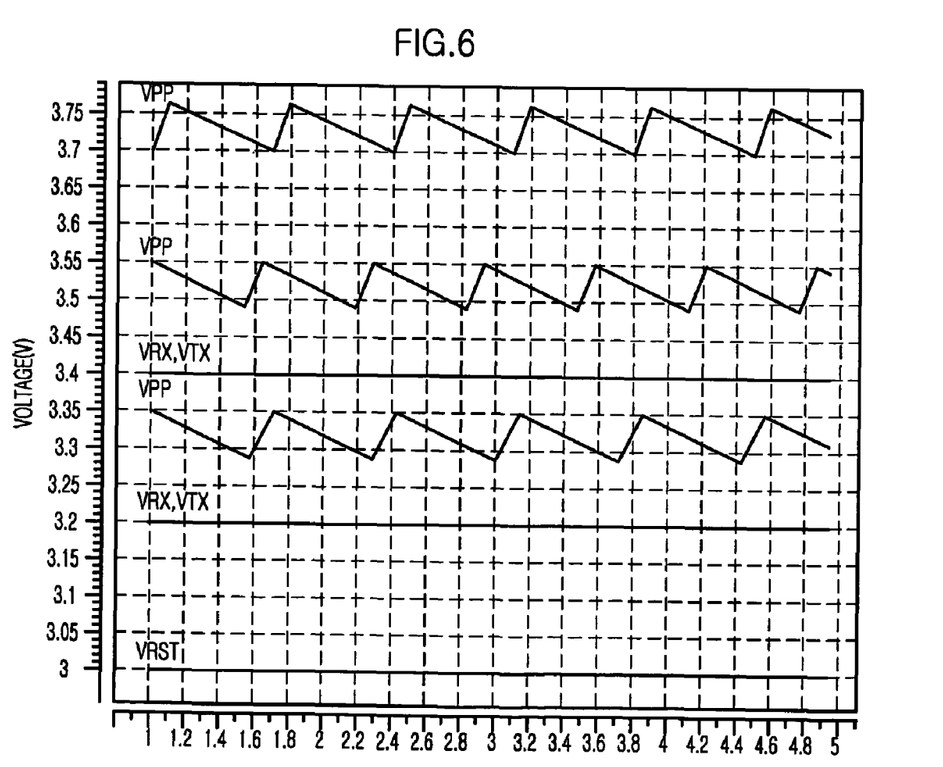

FIGS. 5 and 6 are waveform diagrams showing an operation of the CMOS image sensor of FIG. 2. In particular, FIG. 5 shows that the high voltage VPX is outputted with a constant level without any variation although the reference high voltage VPP is fluctuated, in which the high voltage VPX becomes the gate voltages VTX and VRX of the transfer and the reset transistors 11 and 12, respectively. FIG. 6 shows that the high voltage VPX may be outputted with different constant levels according to the output of the decoder.

An operation of the CMOS image sensor in accordance with the embodiment will be set forth with reference to FIGS. 2 to 6 herebelow.

To begin with, an operation of the reference high voltage generator 200, which generates the reference high voltage VPP, will be illustrated.

The detector 210 detects the level of the reference high voltage VPP transferred to the high voltage output unit 300. When the detection level is lower than a predetermined level, the detector 210 outputs an enabling signal $V_{LD}$ enabling the oscillator 220.

The oscillator 220 oscillates the clock in response to the enabling signal $V_{LD}$ transferred from the detector 210. Thereafter, when the oscillated clock is inputted from the oscillator 220, the charge pump 230 pumps charges to the output terminal. After pumping the charges, the reference high voltage VPP is transferred to the reference high voltage generator 200 while maintaining an original level. At this time, the decoder 240 plays a role in setting the level of the voltage detected at the detector 210.

Considering the operation of the reference high voltage generator 300, to begin with, the voltage divider 311 in the reference voltage generator 310 provides the division voltage VX, i.e., VDDA/2, obtained by dividing the power voltage by two. Then, the reference voltage supplier 312 in the reference voltage generator 310 outputs the reference voltage VPX_REF which is a summation of the division voltage VX with the predetermined voltage.

Assuming that the current passing through the resistor R of the reference voltage supplier 312 is I, the output, i.e., the reference voltage VPX_REF becomes VX+RI. At this time, by adjusting the currents passing through the current sources Is1 and Is2, it is possible to control the reference voltage VPX_REF to have a desired voltage level. This may be achieved by modulating the set value through the decoder 330.

The operational amplifier A of the regulator 320 compares the reference voltage VPX_REF and the feedback voltage VPX_COMP to equalize to each other. That is, when the feedback voltage VPX_COMP becomes equalized to the reference voltage VPX_REF, the high voltage VPX is outputted finally. Herein, the relationship between the high voltage VPX and the reference voltage satisfies a following equation, i.e., VPX=2×VPX_REF.

The high voltage VPX is supplied to the gate of the transfer transistor 11 or the reset transistor 12 in the unit pixel of the CMOS image sensor. Alternatively, the high voltage VPX may be applied to both the gates of the transfer transistor 11 and the reset transistor 12.

When the high voltage VPX is supplied to the gate of the transfer transistor 11 in accordance with the present invention, it is possible to transfer more amount of electrons which cannot be transferred from the photodiode 10 to the sensing node FD due to the threshold voltage of the transfer transistor 11 in the conventional CMOS image sensor.

Therefore, since much more electrons may be transferred from the photodiode 10, it is possible to increase the dynamic range of the unit pixel and enhance the image under low light level condition, which results in providing good image quality.

In addition, when the high voltage VPX is applied to the gate of the reset transistor 12, it is possible to eliminate the electrons existing at the sensing node FD as much as the threshold voltage for turning on the reset transistor 12.

Herein, the reason why the reference high voltage VPP generated at the reference high voltage generator 200 is not directly supplied to the unit pixel is that the level of the reference high voltage VPP is continuously varied because the reference high voltage VPP is achieved by the charge-pumping. At this time, the variation amount of the reference high voltage level ranges from about 100 mV to 200 mV. Thus, if the reference high voltage VPP with the variation is directly supplied to the unit pixel, the reset voltage of the unit pixel is also varied with the amount of about 10 mV to 20 mV, which results in decreasing resolution at an A/D converter so as to degrade the image quality of the image sensor in a large amount.

To address this problem, the reference high voltage VPP is made to have the voltage level higher than that of the high voltage VPX by about 0.3 V to 0.5 V, and then the reference high voltage VPP is used after reducing its voltage level to a predetermined level. At this time, the high voltage VPX outputted through the regulator 320 is insensitive to the operational voltage variation, the temperature variation, the variations of the process condition, or the like.

Although it is illustrated four transistors used for the unit pixel in the present invention, it is possible to configure the unit pixel with three transistors without employing the transfer transistor. In this case, the loss due to the threshold voltage of the reset transistor may also be eliminated by applying the high voltage VPX to the gate of the reset transistor.

As described above, in accordance with the present invention, because the high voltage of which the level is higher than the power voltage level is applied to the gate of the reset transistor and/or the transfer transistor among the transistors in the unit pixel of the CMOS image sensor, the voltage loss due to the threshold voltage of the reset transistor may be eliminated and further the transfer loss due to the threshold voltage of the transfer transistor may be compensated, to thereby increase the dynamic range of the unit pixel and improve the image under the low light level condition. Therefore, it is possible to maintain good image quality.

The present application contains subject matter related to Korean patent application No. 2004-115887, filed in the Korean Intellectual Property Office on Dec. 30, 2004, the entire contents of which is incorporated herein by reference. While the present invention has been described with respect to certain preferred embodiments, it will be apparent to those skilled in the art that various changes and modifications may be made without departing from the scope of the invention as defined in the following claims.

What is claimed is:

1. A complementary metal-oxide semiconductor (CMOS) image sensor, comprising: a unit pixel configured to be controlled by a high voltage, wherein the unit pixel includes: a transfer transistor configured to transfer a data signal from a photodiode to a sensing node; and a reset transistor connected between a power voltage supply terminal and the sensing node, wherein the power voltage supply terminal is configured to generate a power voltage; a reference high voltage generator configured to generate a reference high voltage; and a high voltage output unit configured to generate the high voltage by using the reference high voltage as an operating voltage to output the high voltage to the unit pixel, wherein the high voltage output unit includes a regulator having an operational amplifier configured to receive both the reference high voltage and a ground voltage, and wherein the regulator is configured to decrease the reference high voltage to the high voltage to output the high voltage in response to a reference voltage.

2. The CMOS image sensor of claim 1, wherein the reference voltage generator comprises:
    a voltage divider configured to output a division voltage obtained by dividing the power voltage applied from the power voltage supply terminal; and
    a reference voltage supplier configured to supply the reference voltage obtained by summing the division voltage with a predetermined voltage with a constant level due to a set value.

3. The CMOS image sensor of claim 1, wherein the reference high voltage generator includes:
    a detector configured to detect the level of the reference high voltage inputted to the high voltage output unit;
    an oscillator configured to output an oscillated clock corresponding to the detection result of the detector;
    a charge pump configured to pump charges to an output terminal such that the reference high voltage is supplied to the high voltage output unit in response to the oscillated clock of the oscillator; and
    a decoder configured to transfer a set value to the detector to adjust a level of a voltage detected at the detector.

4. The CMOS image sensor of claim 1, wherein the high voltage output unit comprises: a reference voltage generator configured to output the reference voltage obtained by dividing the power voltage by a predetermined value.

5. The CMOS image sensor of claim 4, wherein the high voltage output unit comprises a decoder configured to supply a set value to the reference voltage generator to adjust the level of the reference voltage.

6. The CMOS image sensor of claim 1, wherein the regulator further comprises a first PMOS transistor configured to receive the reference high voltage and to output the high voltage in response to an output of the operational amplifier.

7. The CMOS image sensor of claim 6, wherein the regulator further comprises a second PMOS transistor connected to the first PMOS transistor, and wherein the second PMOS transistor is configured to provide the feedback voltage.

8. The CMOS image sensor of claim 7, wherein the regulator further comprises a third PMOS transistor connected to both the second PMOS transistor and the ground voltage terminal.

9. The CMOS image sensor of claim 1, wherein the high voltage output unit is further configured to stably maintain a voltage level of the high voltage regardless of variations in the reference high voltage level.

10. The CMOS image sensor of claim 1, wherein the ground voltage is configured to be a driving voltage.

11. The CMOS image sensor of claim 1, wherein a feedback voltage and the reference voltage are input to a positive terminal and a negative terminal, respectively.

12. The CMOS image sensor of claim 1, wherein the reference high voltage is higher than the high voltage, and wherein the high voltage is higher than the power voltage.

13. A complementary metal-oxide semiconductor (CMOS) image sensor, comprising: a unit pixel configured to be controlled by a high voltage; a reference high voltage generator configured to generate a reference high voltage; and a high voltage output unit configured to generate the high voltage by using the reference high voltage as an operating voltage to output the high voltage to the unit pixel, wherein the high voltage output unit includes a regulator having an operational amplifier configured to receive both the reference high voltage and a ground voltage, and wherein the regulator is configured to decrease the reference high voltage to the high voltage to output the high voltage in response to a reference voltage.

14. The CMOS image sensor of claim 13, wherein the high voltage output unit comprises: a reference voltage generator configured to output the reference voltage obtained by dividing the power voltage by a predetermined value.

15. The CMOS image sensor of claim 14, wherein the high voltage output unit comprises a decoder configured to supply a set value to the reference voltage generator to adjust the level of the reference voltage.

16. The CMOS image sensor of claim 13, wherein the regulator further comprises a first PMOS transistor configured to receive the reference high voltage and to output the high voltage in response to an output of the operational amplifier.

17. The CMOS image sensor of claim 16, wherein the regulator further comprises a second PMOS transistor connected to the first PMOS transistor, and wherein the second PMOS transistor is configured to provide the feedback voltage.

18. The CMOS image sensor of claim 17, wherein the regulator further comprises a third PMOS transistor connected to both the second PMOS transistor and the ground voltage terminal.

19. The CMOS image sensor of claim 9, wherein the high voltage output unit is further configured to stably maintain a voltage level of the high voltage regardless of variations in the reference high voltage level.

20. The CMOS image sensor of claim 13, wherein the ground voltage is configured to be a driving voltage.

21. The CMOS image sensor of claim 14, wherein a feedback voltage and the reference voltage are input to a positive terminal and a negative terminal, respectively.

22. The CMOS image sensor of claim 13, wherein the reference high voltage is higher than the high voltage, and wherein the high voltage is higher than the power voltage.

23. A complementary metal-oxide semiconductor (CMOS) image sensor, comprising: a unit pixel that includes: a transfer transistor; and a reset transistor configured to generate a power voltage; a reference high voltage generator configured to generate a reference high voltage; and a high voltage output unit configured to generate the high voltage by using the reference high voltage as an operating voltage to output the high voltage to the unit pixel, wherein the high voltage output unit includes a regulator having an operational amplifier configured to receive both the reference high voltage and a ground voltage, and wherein the regulator is configured to decrease the reference high voltage to the high voltage to output the high voltage in response to a reference voltage.

24. The CMOS image sensor of claim 23, wherein the regulator includes:
- a first PMOS transistor configured to receive the reference high voltage and to output the high voltage in response to an output of the operational amplifier;
- a second PMOS transistor connected to the first PMOS transistor, wherein the second PMOS transistor is configured to provide the feedback voltage;
- a third PMOS transistor connected to both the second PMOS transistor and the ground voltage terminal.

25. The CMOS image sensor of claim 23, wherein the ground voltage is configured to be a driving voltage.

26. The CMOS image sensor of claim 23, wherein a feedback voltage and the reference voltage are input to a positive terminal and a negative terminal, respectively.

27. The CMOS image sensor of claim 23, wherein the reference high voltage is higher than the high voltage, and wherein the high voltage is higher than the power voltage.

* * * * *

UNITED STATES PATENT AND TRADEMARK OFFICE
CERTIFICATE OF CORRECTION

PATENT NO.        : 8,149,311 B2
APPLICATION NO.   : 11/321557
DATED             : April 3, 2012
INVENTOR(S)       : Yu

Page 1 of 1

It is certified that error appears in the above-identified patent and that said Letters Patent is hereby corrected as shown below:

IN THE CLAIMS:

In Column 8, Line 48, in Claim 21, delete "Claim 14," and insert -- Claim 13, --, therefor.

Signed and Sealed this
Ninth Day of October, 2012

David J. Kappos
*Director of the United States Patent and Trademark Office*